United States Patent
Ochiai

Patent Number: 5,952,813
Date of Patent: Sep. 14, 1999

[54] BATTERY CHARGING SYSTEM AND ELECTRIC VEHICLE WITH BATTERY CHARGING SYSTEM

[75] Inventor: Shinobu Ochiai, Utsunomiya, Japan

[73] Assignee: Honda Giken Kogyo Kabushiki Kaisha, Tokyo, Japan

[21] Appl. No.: 09/058,279

[22] Filed: Apr. 10, 1998

[30]   Foreign Application Priority Data

Apr. 14, 1997  [JP]  Japan ................................... 9-096137

[51] Int. Cl.⁶ ............................... H02J 7/00; H02H 3/00
[52] U.S. Cl. ................................. 320/104; 320/DIG. 13; 364/140.04
[58] Field of Search .................... 320/104, 166, 320/DIG. 13; 364/140.04; 361/59

[56]   References Cited

U.S. PATENT DOCUMENTS 4,697,182  9/1987  Swanson ............................ 340/870.02
5,317,752  5/1994  Jewett et al. ............................ 395/750

*Primary Examiner*—Peter S. Wong
*Assistant Examiner*—Gregory J. Toatley, Jr.
*Attorney, Agent, or Firm*—Nikaido, Marmelstein, Murray & Oram LLP

[57]   ABSTRACT

When a charging control computer energized by an auxiliary battery detects a failure of an external AC power supply based on a change in the level of a failure on/off signal while a battery, mounted as an energy source on an electric vehicle, is being charged by the external AC power supply, the charging control computer stores a charged time up to the failure of the external AC power supply. Then, the charging control computer immediately changes from a normal power consumption mode to a low power consumption mode. When the charging control computer subsequently detects when the external AC power supply recovers from the failure, the charging control computer calculates a new target charging time from an initial target charging time and the charged time. Wasteful power consumption by the auxiliary battery during the failure of the external AC power supply is minimized. After the external AC power supply recovers from the failure, the charging control computer can charge the battery accurately to its fully charged state.

14 Claims, 5 Drawing Sheets

1

BATTERY CHARGING SYSTEM AND ELECTRIC VEHICLE WITH BATTERY CHARGING SYSTEM

BACKGROUND OF THE INVENTION

1. Field of the Invention

The present invention relates to a battery charging system for interrupting the charging of a battery when the power supply suffers a failure while the battery is being charged and continuing the charging of the battery when the power supply recovers from the failure, and an electric vehicle which has as an energy source the battery which is controlled by the battery charging system.

2. Description of the Related Art

Many electric vehicles which has as an energy source a vehicle-use battery having a high voltage of 288 V or the like carry a battery charger that allows the battery to be charged conveniently at home.

When the vehicle-carried battery charger charges the battery, an input terminal of the vehicle-carried battery charger is electrically connected to an external power supply and an output terminal thereof is electrically connected to the battery. A charging control computer (charging controller) is connected to a control terminal of the vehicle-carried battery charger for controlling the charging of the battery.

The charging control computer itself is energized by an auxiliary battery such as a vehicle-carried battery having a low voltage of 12 V or the like for energizing electronic parts including ICs. In order to distinguish from such an auxiliary battery, the battery as the energy source for the electric vehicle is referred to as a main battery.

The auxiliary battery is charged by a current supplied from the main battery through a DC/DC converter.

It has been found that when the external power supply suffers a failure while it is charging the main battery, if the power supply failure continues for a long time, then the auxiliary battery is discharged to the extent that its capacity becomes nil and hence the capacity of the main battery is also eliminated because the charging control computer is continuously operated. Once the capacity of the main battery is eliminated, even when the power supply recovers from the failure, the main battery will not start being charged until the auxiliary battery is recharged.

One solution is to automatically shut down the charging control computer when the external power supply suffers a failure. Because the charging control computer is automatically shut down, the auxiliary battery is prevented from being fully discharged. However, even when the power supply recovers from the failure, the auxiliary battery does not resume its charging, and will not be fully charged. It is important to solve these problems because batteries on electric vehicles are usually charged at night and it normally takes several hours for the batteries to be fully charged.

SUMMARY OF THE INVENTION

It is a general object of the present invention to provide a battery charging system for preventing the electric energy stored in a vehicle-carried battery from being consumed wastefully and hence preventing the capacity of the vehicle-carried battery from being eliminated even when a power supply suffers a failure while the vehicle-carried battery is being charged and the failure continues for a long period of time, and an electric vehicle which incorporates the battery charging system.

A major object of the present invention is to provide a battery charging system for resuming the charging of a vehicle-carried battery accurately to a fully charged state when a power supply, after it has suffered a failure while charging the vehicle-carried battery, recovers from the failure, and an electric vehicle which incorporates the battery charging system.

The above and other objects, features, and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
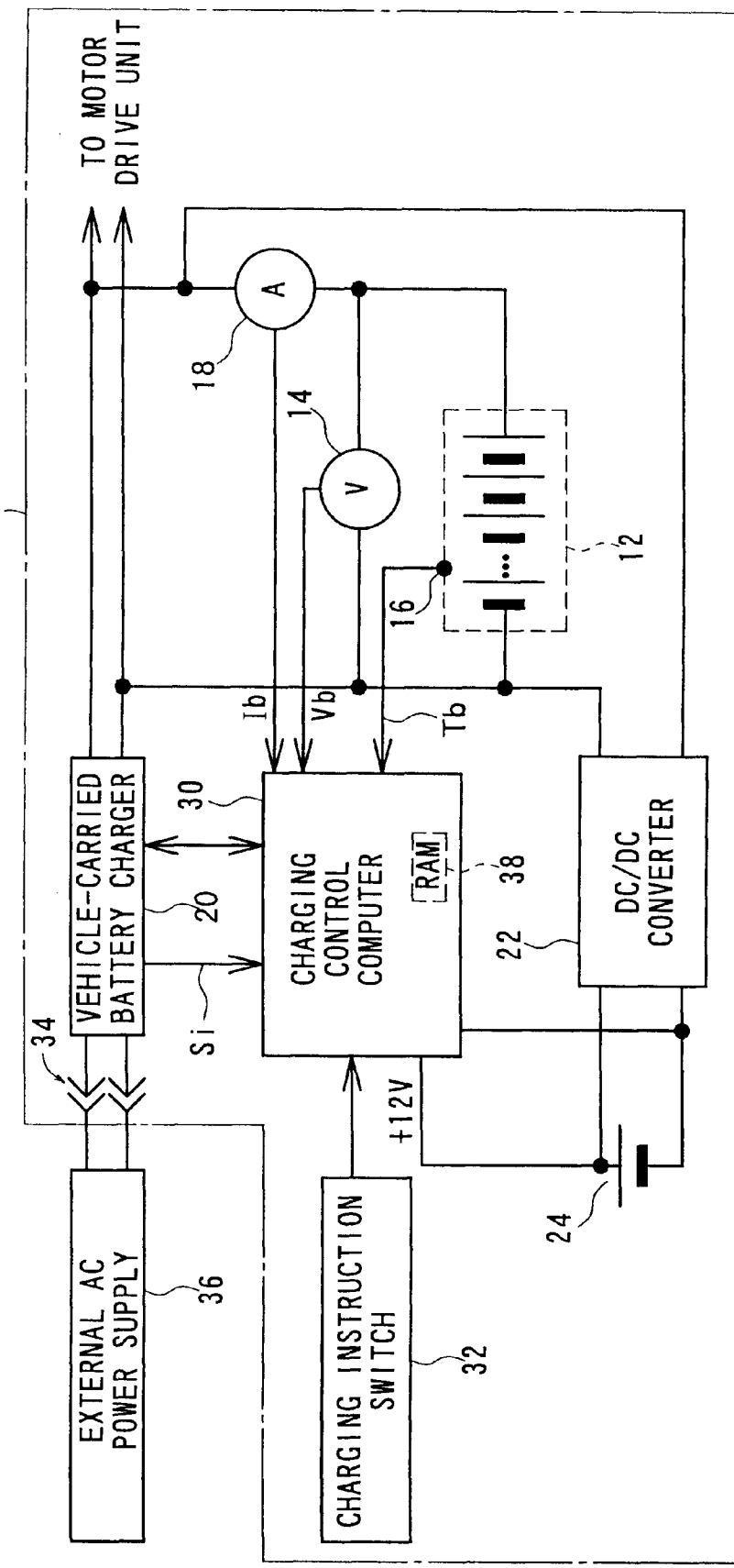
FIG. 1 is a block diagram of an electric vehicle which incorporates a battery charging system according to the present invention.

FIG. 1 shows in block form an electric vehicle 10 which incorporates a battery charging system according to the present invention.

As shown in FIG. 1, the electric vehicle 10 carries a battery (hereinafter also referred to as a "main battery") 12 having a high rated voltage of +288 V. The battery 12 comprises, for example, 24 series-connected nickel-hydrogen secondary cells each having a rated voltage of +12 V. A voltage sensor (voltage detecting means) 14 is connected across the battery 12 for detecting a battery voltage Vb thereof. A temperature sensor (temperature detecting means) 16 is attached to the battery 12 for detecting the temperature thereof. A current sensor (current detecting means) 18 is connected in series to the battery 12 for detecting a charging current which flows into the battery 12 and a discharging current which flows from the battery 12.

Positive and negative terminals of the battery 12 are connected to a vehicle-carried battery charger 20 through a contactor (not shown), and also connected to a DC/DC converter 22 and a propulsive electric motor (not shown), which serves as a load, through a motor drive unit (not shown).

The DC/DC converter 22 lowers the voltage of the main battery 12 to a lower voltage of +12 V for charging an auxiliary battery (vehicle-carried battery) 24, and supplies a charging electric energy to the auxiliary battery 24.

The auxiliary battery 24 serves as a +12V power supply and is connected to a charging control computer (charging controller) 30.

A charging instruction switch 32 for selectively turning on and off a charging control process is connected to the charging control computer 30.

The charging control computer 30 serves to perform various functions or operate as various means such as control, decision, processing, calculating, timing, clock, and storing means, for controlling the vehicle-carried battery charger 20 while communicating therewith. The vehicle-carried battery charger 20 supplies a failure on/off signal Si to the charging control computer 30.

Each of the charging control computer 30 and the vehicle-carried battery charger 20 comprises a microcomputer including a ROM as a storing means (memory) for storing a system program and an application program for failure control, a RAM as a storing means (memory) operating as a work memory, a timer as a timing means for measuring time, and input/output interfaces including an A/D converter and a D/A converter.

A RAM 38, indicated by the dotted line in the charging control computer 30, serves as a charging state storing means, and is backed up by the auxiliary battery 24 for holding its stored data.

The vehicle-carried battery charger 20 has input terminals connected through a connector 34 to an external AC power supply 36 having an AC voltage of 200 V or the like.

Figure 2:
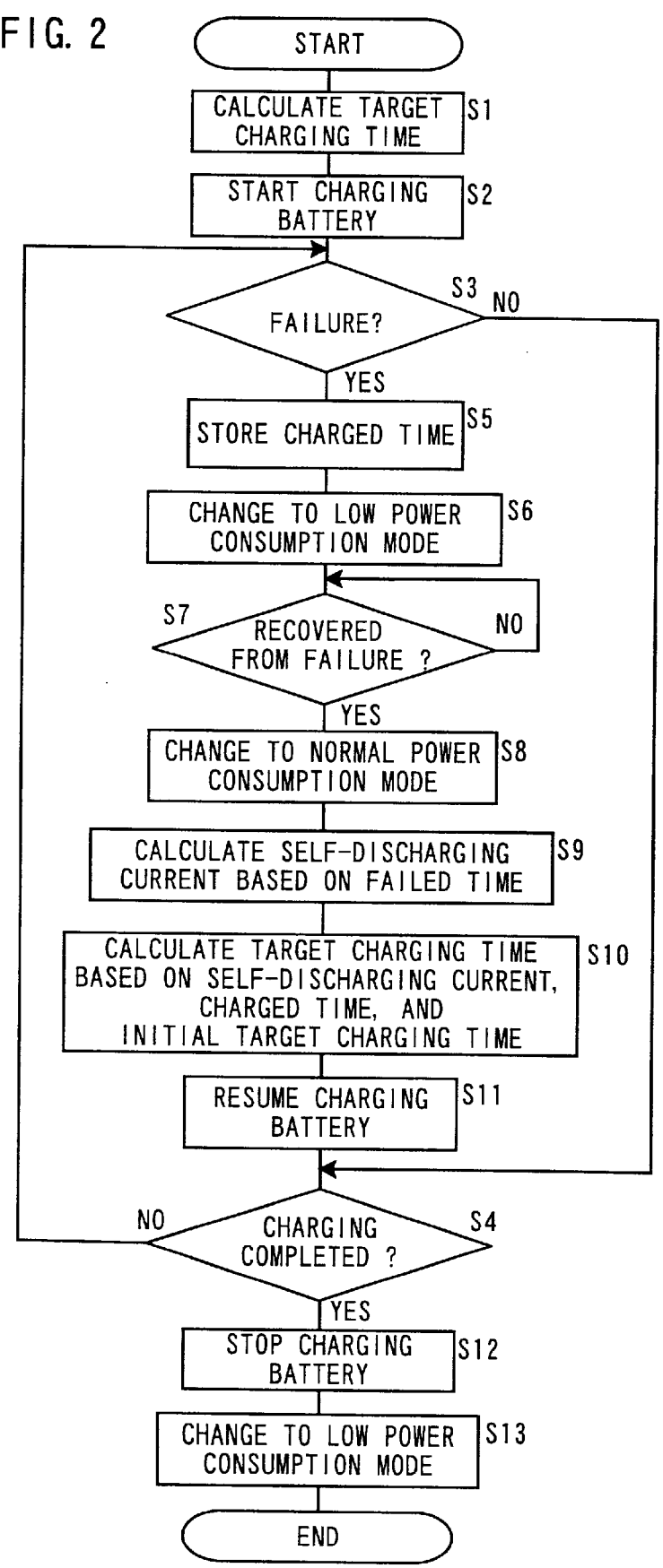
FIG. 2 is a flowchart of a first charging control process which is carried out by the battery charging system incorporated in the electric vehicle shown in FIG. 1.

A first charging control process which is carried out when the external AC power supply 36 suffers a failure will be described below with reference to FIG. 2.

The capacity of the battery 12 is expressed by the number of ampere-hours (AHD), and the charging control computer 30 serves as control in the charging control process and other processes described later on.

According to the first charging control process, the battery 12 is judged as being fully charged (completed in charging) when the battery 12 has been charged with a constant current (charging current) for a predetermined time (target charging time).

When the charging instruction switch 32 is turned on, a target charging time is calculated in a step S1 according to the following equation (1):

$$\text{Target charging time} = \{(\text{fully charged capacity} - \text{remaining capacity}) \times 1.1\} / \text{charging current} \quad (1)$$

where 1.1 is a constant determined by the charging efficiency.

Since the fully charged capacity of the battery 12 is known, the remaining capacity thereof can be determined by calculating (charging and discharging current Ib×time).

The battery 12 starts being charged with the constant charging current in the equation (1), and the charging time that is consumed by charging the battery 12 starts being measured by the timing means in a step S2. At this time, the electric energy supplied from the external AC power supply 36 is converted by the vehicle-carried battery charger 20 into a high-voltage DC electric energy that is supplied as the constant current to the battery 12.

Then, it is determined whether the external AC power supply 36 suffers a failure based on the level of the failure on/off signal Si (e.g., the level of the failure on/off signal Si is high when the external AC power supply 36 suffers a failure, and low when the external AC power supply 36 does not suffer failure) in a step S3.

If the external AC power supply 36 does not suffer a failure, i.e., if the level of the failure on/off signal Si is low (NO in the step S3), then control jumps to a step S4 which decides whether the charging of the battery 12 is completed, i.e., the battery 12 is fully charged, by checking if the charging time which is being measured has reached the target charging time according to the equation (1).

If the external AC power supply 36 suffers a failure, i.e., if the level of the failure on/off signal Si goes high (YES in the step S3), then control proceeds from the step S3 to a step S5 for failure control.

In the step S5, a period of time from the time when the battery 12 has started being charged to the time when the power supply failure is detected, i.e., a charged time, is stored in the RAM 38, and the time when the battery 12 has started suffering the failure is also stored in the RAM 38.

Then, the charging control computer 30 switches from a normal power consumption mode to a low power consumption mode, i.e., a sleep mode in a step S6. The current consumed by the charging control computer 30 now decreases from an ampere level in the normal power consumption mode to a milliampere level in the low power consumption mode, for example, and the charging control computer 30 starts temporarily interrupting the charging of the battery 12. Thereafter, the charging control computer 30 functions as a recovery-from-failure monitor.

The charging control computer 30 monitors the level of the failure on/off signal Si in order to detect whether the external AC power supply 36 recovers from the failure in a step S7.

If the level of the failure on/off signal Si goes low, then the external AC power supply 36 is judged as recovering from the failure (YES in the step S7).

The charging control computer 30 then switches from the low power consumption mode back to the normal power consumption mode in a step S8.

The period of time in which the external AC power supply 36 has suffered from the failure, i.e., the failed time, is calculated from the time when the power supply failure started suffering the failure and the time (present time) when the external AC power supply 36 has recovered from the failure, and a capacity reduction (self-discharging current quantity) due to a self-discharging current that has flowed in the failed time is calculated in a step S9.

Thereafter, in a step S10, a target charging time upon resuming the charging of the battery 12 is calculated according to the following equation (2):

$$\text{Target charging time} = \text{initial target charging time} - \text{charged time} + (\text{self-discharging current quantity} / \text{charging current}) \quad (2)$$

where the initial target charging time is the target charging time calculated in the step S1, the charged time is the charged time stored in the RAM 38 in the step S4, and the (self-discharging current quantity/charging current) is a charging time to make up for the capacity reduction due to the self-discharging current.

Then, the charging of the battery 12 is resumed in a step S11.

The step S4 decides whether the charging of the battery 12 is completed by checking if the charging time which is being measured has reached the target charging time upon resuming the charging of the battery 12 according to the equation (2). If the charging of the battery 12 is not completed (NO in the step S4), then control goes back to the step S3 for monitoring the failure on/off signal Si.

If the charging time which is being measured has reached the target charging time (YES in the step S4), regardless of whether the battery 12 has continuously been charged without a power supply failure or the battery 12 has been charged after recovery from a power supply failure, then the charging of the battery 12 is stopped in a step S12.

Thereafter, the charging control computer 30 switches from the normal power consumption mode to the low power consumption mode in a step S13.

According to the first charging control process in which the charging of the battery 12 is controlled on the basis of the target charging time, the charging control computer 30 monitors the level of the failure on/off signal Si from the vehicle-carried battery charger 20 while the battery 12 is being charged by the external AC power supply 36 through the vehicle-carried battery charger 20. When the charging control computer 30 detects a failure of the external AC power supply 36 based on a transition from the low level to the high level of the failure on/off signal Si, the charging control computer 30 stores the charged time consumed until the time when the failure of the external AC power supply 36 has occurred, and immediately switches from the normal power consumption mode to the low power consumption mode. Thereafter, the charging control computer 30 monitors the level of the failure on/off signal Si again. When the charging control computer 30 detects recovery of the external AC power supply 36 from the failure, the charging control computer 30 determines, as a new target charging time, a remaining charging time that is calculated by subtracting the charged time from the initial target charging time, taking into account the self-discharging current quantity, according to the equation (2), and resumes the charging of the battery 12 using the new target charging time.

During a failure of the external AC power supply 36, since the charging control computer 30 is in the low power consumption mode, the consumption of the electric energy stored in the auxiliary battery 24 is minimized, avoiding wasteful battery energy consumption. Furthermore, the battery 12 can be charged accurately to a fully charged state because the charging of the battery 12 is resumed on the basis of the charged time of the battery 12 at the time the failure of the external AC power supply 36 was detected.

Figure 3:
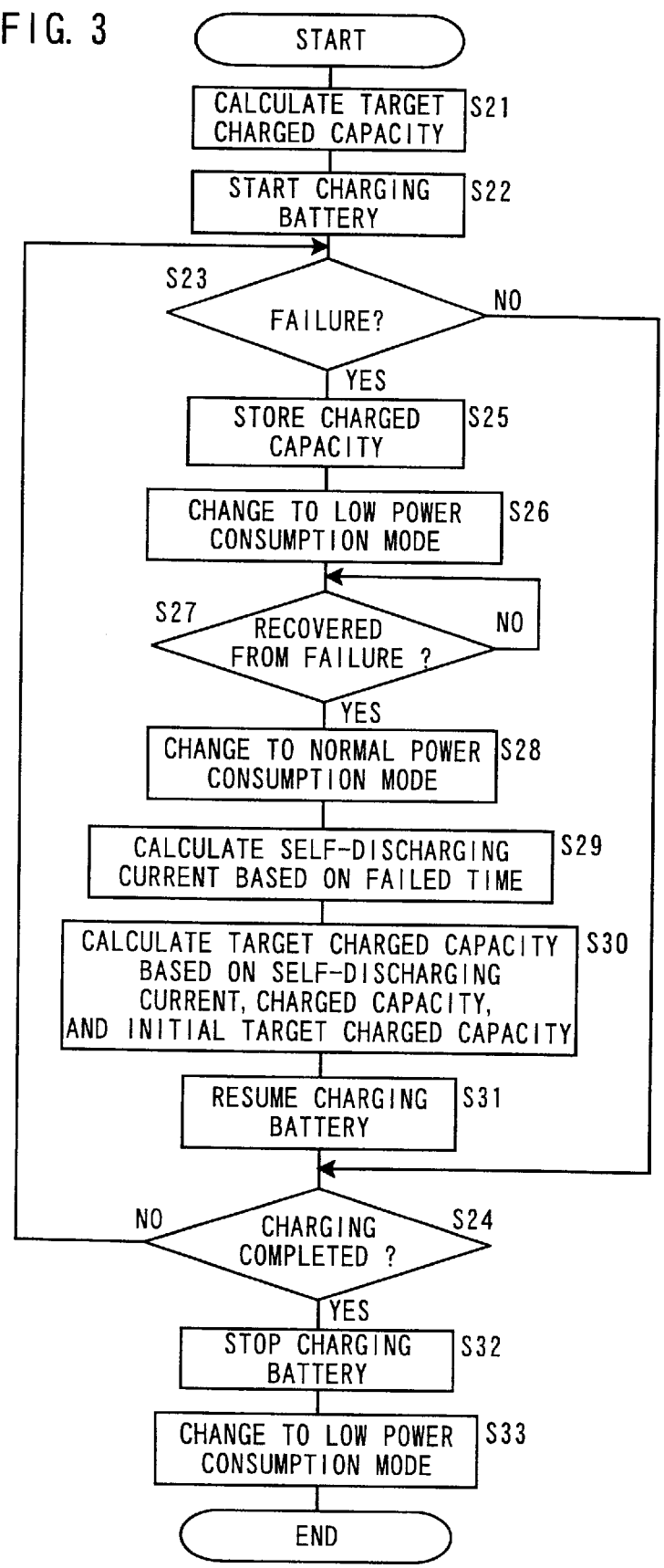
FIG. 3 is a flowchart of a second charging control process which is carried out by the battery charging system incorporated in the electric vehicle shown in FIG. 1.

A second charging control process which is carried out when the external AC power supply 36 suffers a failure will be described below with reference to FIG. 3.

According to the second charging control process, the battery 12 is judged as being fully charged (completed in charging) when the battery 12 has been charged with a constant current and a charged capacity (charging current quantity×charging time) thereof reaches a predetermined value. Steps of the second charging control process which are similar to those of the first charging control process are denoted by the step numbers of those of the first charging control process with "20" added thereto.

When the charging instruction switch 32 is turned on, a target charged capacity (constant charging current×charging time) is calculated in a step S21 according to the following equation (3):

Target charged capacity=(fully charged capacity−remaining capacity)×1.1 (3)

where 1.1 is a constant determined by the charging efficiency.

Since the fully charged capacity of the battery 12 is known, the remaining capacity thereof can be determined by calculating (charging and discharging current Ib×time).

The battery 12 starts being charged with the constant charging current established when the target charged capacity is calculated, and the charging time that is consumed by charging the battery 12 starts being measured by the timing means in a step S22. At this time, the electric energy supplied from the external AC power supply 36 is converted by the vehicle-carried battery charger 20 into a high-voltage DC electric energy that is supplied as the constant current to the battery 12.

Then, it is determined whether the external AC power supply 36 suffers a failure based on the level of the failure on/off signal Si in a step S23.

If the external AC power supply 36 does not suffer a failure (NO in the step S23), then control jumps to a step S24 which decides whether the charging of the battery 12 is completed, i.e., the battery 12 is fully charged, by checking if the product of the charging time being measured and the established charging time, i.e., the charged capacity, has reached the target charging time according to the equation (3). Whether the battery 12 is fully charged or not may alternatively be decided by comparing a rate of change of the temperature of the battery 12 or a rate of change of the voltage across the battery 12 with a predetermined value, as disclosed in Japanese laid-open patent publication No. 8-331769, for example.

If the external AC power supply 36 suffers a failure (YES in the step S23), then control proceeds from the step S23 to a step S25 for failure control.

In the step S25, a charged capacity which is calculated by multiplying a period of time from the time when the battery 12 has started being charged to the time when the power supply failure is detected, by the established charging current is stored in the RAM 38, and the time when the battery 12 has started suffering the failure is also stored in the RAM 38.

Then, the charging control computer 30 switches from the normal power consumption mode to the low power consumption mode, i.e., the sleep mode in a step S26.

The charging control computer 30 detects whether the external AC power supply 36 recovers from the failure in a step S27.

If the external AC power supply 36 is judged as recovering from the failure (YES in the step S27), then the charging control computer 30 switches from the low power consumption mode back to the normal power consumption mode in a step S28.

The period of time in which the external AC power supply 36 has suffered from the failure, i.e., the failed time, is calculated from the time when the external AC power supply 36 started to suffer the failure and the time (present time) when the external AC power supply 36 has recovered from the failure, and a capacity reduction (self-discharging current quantity) due to a self-discharging current that has flowed in the failed time is calculated in a step S29.

Thereafter, in a step S30, a target charged capacity upon resuming the charging of the battery 12 is calculated according to the following equation (4):

Target charged capacity=initial target charged capacity−charged capacity+self-discharging current quantity (4)

where the initial target charged capacity is the target charged capacity calculated in the step S21, and the charged capacity is the charged capacity stored in the RAM 38 in the step S24.

Then, the charging of the battery 12 is resumed in a step S31.

The step S24 decides whether the charging of the battery 12 is completed by checking if the target charged capacity upon resuming the charging of the battery 12 is reached according to the equation (4). If the charging of the battery 12 is not completed (NO in the step S24), then control goes back to the step S23 for monitoring the external AC power supply 36 for a failure.

If the charging of the battery 12 up to the target charged capacity is completed (YES in the step S24), then the charging of the battery 12 is stopped in a step S32.

Thereafter, the charging control computer 30 switches from the normal power consumption mode to the low power consumption mode in a step S33.

According to the second charging control process in which the charging of the battery 12 is controlled on the basis of the target charged capacity, the consumption of the electric energy stored in the auxiliary battery 24 is minimized during a failure of the external AC power supply 36, and when the external AC power supply 36 recovers from the failure, the charging of the battery 12 is controlled accurately in view of the charged state achieved thus far. In addition, the full charged capacity can be determined more accurately than in the first charging control process.

Figure 4:
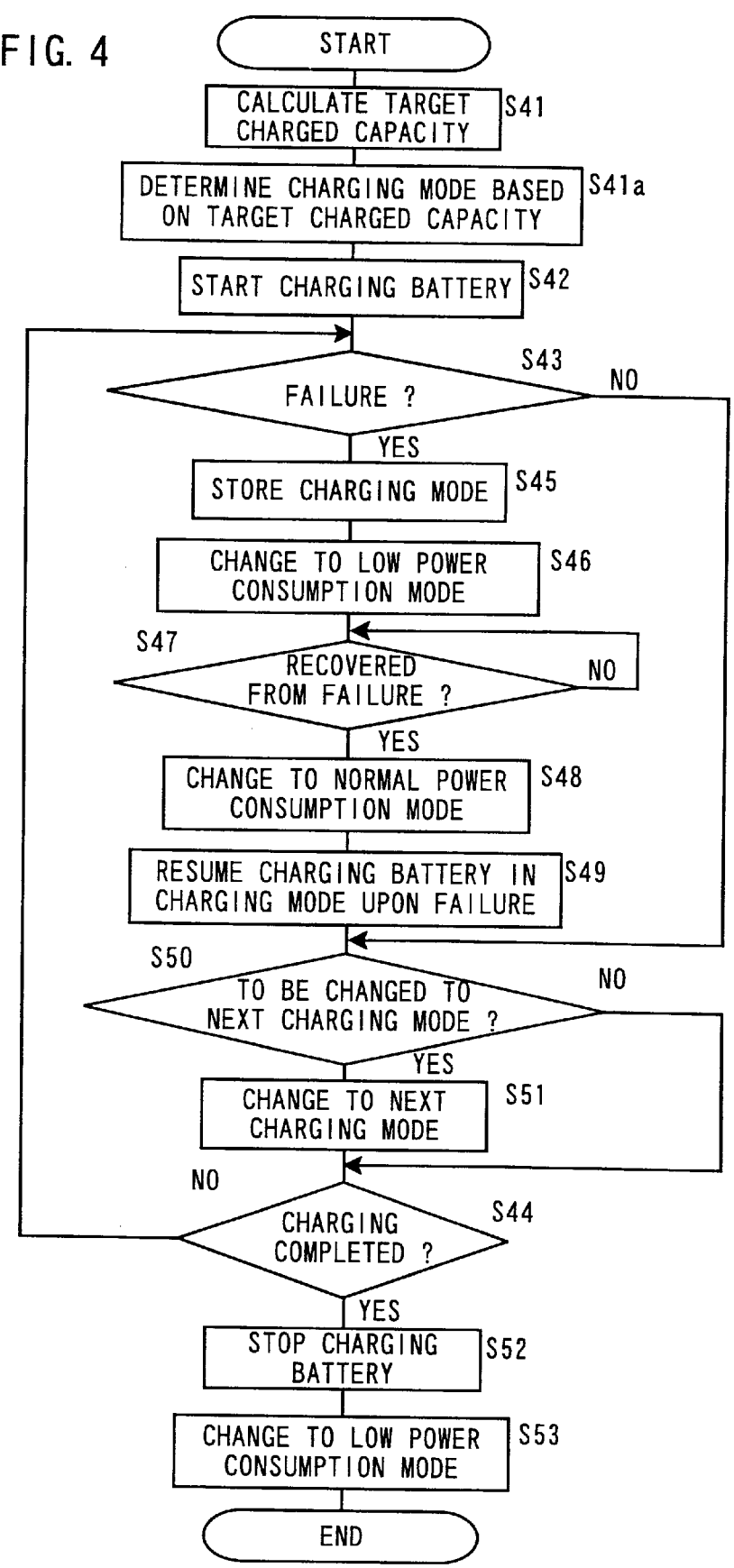
FIG. 4 is a flowchart of a third charging control process which is carried out by the battery charging system incorporated in the electric vehicle shown in FIG. 1.

A third charging control process which is carried out when the external AC power supply 36 suffers a failure will be described below with reference to FIG. 4.

According to the third charging control process, the battery 12 is charged in various charging modes including constant-power charging modes and constant-current charging modes. Steps of the third charging control process which are similar to those of the first charging control process are denoted by the step numbers of those of the first charging control process with "40" added thereto.

When the charging instruction switch 32 is turned on, a target charged capacity (constant charging current×charging time) is calculated in a step S41 according to the equation (3) referred to above.

Based on the calculated target charged capacity, one of first through charging modes, given below, is determined in a step S41a. The greater the calculated target charged capacity, the smaller the ordinal number of a charging mode which is to be selected.

First charging mode: a constant-power charging mode for charging the battery 12 at 5 kW;

Second charging mode: a constant-power charging mode for charging the battery 12 at 2 kW;

Third charging mode: a constant-current charging mode for charging the battery 12 at 5A; and Four charging mode: a constant-current charging mode for charging the battery 12 at 2A.

In a step S42, the battery 12 starts being charged in the charging mode which is determined in the step S41a.

Then, it is determined whether the external AC power supply 36 suffers a failure based on the level of the failure on/off signal Si in a step S43.

If the external AC power supply 36 does not suffer a failure (NO in the step S43), then control jumps to a step S50 for determining the charging mode. After the step S50, the present charging mode is continued or changes to a next charging mode in a step S51. Then, a step S44 decides whether the charging of the battery 12 is completed, i.e., the battery 12 is fully charged by comparing a rate of change of the temperature of the battery 12 or a rate of change of the voltage across the battery 12 with a predetermined value, as disclosed in Japanese laid-open patent publication No. 8-331769, for example.

If the external AC power supply 36 suffers a failure (YES in the step S43), then control proceeds from the step S43 to a step S45 for failure control.

In the step S45, the charging mode (one of the first through four charging modes) immediately prior to the failure of the external AC power supply 36 is stored in the RAM 38.

Then, the charging control computer 30 switches from the normal power consumption mode to the low power consumption mode, i.e., the sleep mode in a step S46.

The charging control computer 30 detects whether the external AC power supply 36 recovers from the failure in a step S47.

If the external AC power supply 36 is judged as recovering from the failure (YES in the step S47), then the charging control computer 30 switches from the low power consumption mode back to the normal power consumption mode in a step S48.

Thereafter, the charging control computer 30 resumes the charging of the battery 12 in the charging mode which is stored in the RAM 38 in a step S49.

Figure 5:
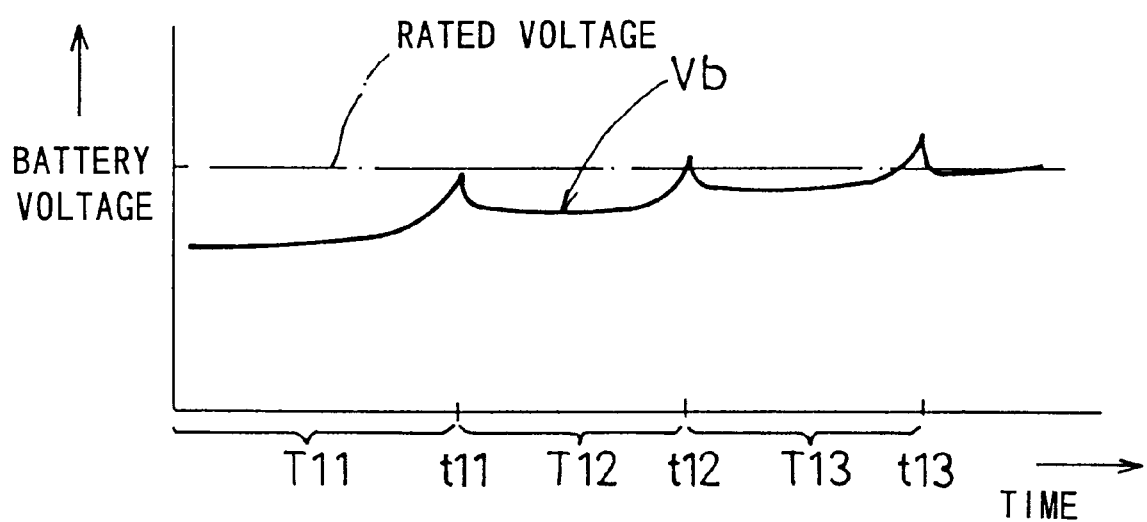
FIG. 5 is a diagram illustrative of the manner in which charging modes are detected in the third process.

Then, the charging control computer 30 decides whether the present charging mode is to change to a next charging mode in a step S50. The step S50 may be carried out by referring to a change in the voltage Vb (see FIG. 5) across the battery 12 which has been recognized and stored by the charging control computer 30. In FIG. 5, the battery voltage Vb is lower than a rated voltage and changes in a period T11 which represents the first charging mode. It can be seen from FIG. 5 that as the first charging mode draws to an end, the change of the battery voltage Vb, i.e., its differential, gradually becomes greater. The end at a time t11 of the first charging mode can be detected by continuously detecting the battery voltage Vb and the change of the battery voltage Vb, i.e., its differential. A period T12 from the time t11 to a time T12 represents the second charging mode, and a period T13 from the time t12 to a time t13 represents the third charging mode.

When the end of a charging mode is detected, the charging mode changes to a next charging mode in the step S51. If the end of the final charging mode or each of the charging modes is not detected (NO in the step S50), or after the present charging mode changes to a next charging mode in the step S51, the step S44 decides whether the charging of the battery 12 is completed. If the charging of the battery 12 is not completed (NO in the step S44), then control goes back to the step S43 for monitoring the external AC power supply 36 for a failure.

If the charging of the battery 12 is completed (YES in the step S44), then the charging of the battery 12 is stopped in a step S52.

Thereafter, the charging control computer 30 switches from the normal power consumption mode to the low power consumption mode in a step S53.

According to the third charging control process in which the charging of the battery 12 is controlled on the basis of the charging modes, the consumption of the electric energy stored in the auxiliary battery 24 is minimized during a failure of the external AC power supply 36, and when the external AC power supply 36 recovers from the failure, the charging of the battery 12 is controlled accurately in view of the charged state achieved thus far. In addition, the full charged capacity can be determined more accurately than in the first charging control process.

As described above, according to the present invention, when the external power supply suffers a failure while the battery is being charged, the charging controller switches from the normal power consumption mode to the low power consumption mode. Consequently, wasteful power consumption by the auxiliary battery and hence the main battery is held to a minimum during the failure of the external power supply.

Since the charging controller switches from the low power consumption mode back to the normal power consumption mode when the external power supply recovers from the failure, the charging of the battery with the charging controller is automatically resumed.

The charging of the battery is resumed on the basis of a state of the battery at the time the failure of the external power supply is detected, i.e., a history of the battery at the time the failure of the external power supply is detected. Therefore, the charging of the battery is resumed accurately by the charging controller.

In the present invention, the case referred to as "the failure of the external power supply" involves all the situations in which electricity is not supplied to the vehicle-carried battery charger 20, such as a case of the failure of the external AC power supply 36 itself, a case of the unexpected disconnection of an unillustrated plug used to electrically connect between the unillustrated AC electric fixed outlet and the external AC power supply 36, a case of the interruption of power supply from an unillustrated transforming station etc. to the external AC power supply 36, and so on.

Although a certain preferred embodiment of the present invention has been shown and described in detail, it should be understood that various changes and modifications may be made therein without departing from the scope of the appended claims.

What is claimed is:

1. A battery charging system comprising:

a battery charger for charging a battery;

a charging controller for controlling said battery charger;

an external power supply for supplying electric energy to said battery charger to charge the battery; and a vehicle-carried battery for supplying electric energy to said charging controller;

said charging controller comprising:

failure detecting means for detecting a failure of said external power supply;

temporary charging stopping means for controlling said charging controller to change from a normal power consumption mode to a low power consumption mode and temporarily stopping charging of the battery with said battery charger when a failure of said external power supply is detected by said failure detecting means;

recovery-from-failure detecting means for detecting when said external power supply recovers from the failure; and charging resuming means for controlling said charging controller to change from the low power consumption mode to the normal power consumption mode and resuming charging of the battery with said battery charger when recovery of said external power supply from the failure is detected by said recovery-from-failure detecting means.

2. A battery charging system according to claim 1, wherein said charging controller further comprises charged state storing means for temporarily storing a charged state of the battery from a start of the charging of the battery to the failure of said external power supply when the failure of said external power supply is detected by said failure detecting means, said charging resuming means comprising means for resuming the charging of the battery with said battery charger based on the charged state temporarily stored by said charged state storing means when recovery of said external power supply from the failure is detected by said recovery-from-failure detecting means.

3. A battery charging system according to claim 2, wherein said charged state represents a charged time from the start of the charging of the battery to the failure of said external power supply if said charging controller controls the charging of the battery based on a target charging time, said charging resuming means comprising means for resuming the charging of the battery with said battery charger based on a remaining charging time which is calculated by subtracting said charged time from said target charging time.

4. A battery charging system according to claim 2, wherein said charged state represents a charged capacity from the start of the charging of the battery to the failure of said external power supply if said charging controller controls the charging of the battery based on a target charging capacity, said charging resuming means comprising means for resuming the charging of the battery with said battery charger based on a remaining charging capacity which is calculated by subtracting said charged capacity from said target charged capacity.

5. A battery charging system according to claim 2, wherein said charged state represents a charging mode upon the failure of the external power supply if said charging controller controls the charging of the battery based on a plurality of charging modes, said charging resuming means comprising means for resuming the charging of the battery with said battery charger based on the charging mode stored by said charged state storing means.

6. A battery charging system according to claim 1, wherein said vehicle-carried battery comprises an auxiliary battery separate from the battery to be charged by said battery charger.

7. A battery charging system according to claim 6, further comprising means for charging said auxiliary battery with electric energy from the battery to be charged by said battery charger.

8. An electric vehicle comprising:

a battery charger for charging a battery with electric energy supplied from an external power supply and generating a failure on/off signal indicative of a failure/non-failure of said external power supply;

a charging controller for controlling said battery charger; and a vehicle-carried battery for supplying electric energy to said charging controller;

said charging controller comprising:

failure detecting means for detecting a failure of said external power supply based on said failure on/off signal;

temporary charging stopping means for controlling said charging controller to change from a normal power consumption mode to a low power consumption mode and temporarily stopping charging of the battery with said battery charger when a failure of said external power supply is detected by said failure detecting means based on said failure on/off signal;

recovery-from-failure detecting means for detecting when said external power supply recovers from the failure; and charging resuming means for controlling said charging controller to change from the low power consumption mode to the normal power consumption mode and resuming charging of the battery with said battery charger when recovery of said external power supply from the failure is detected by said recovery-from-failure detecting means.

9. An electric vehicle according to claim 8, wherein said charging controller further comprises charged state storing means for temporarily storing a charged state of the battery from a start of the charging of the battery to the failure of said external power supply when the failure of said external power supply is detected by said failure detecting means based on said failure on/off signal, said charging resuming means comprising means for resuming the charging of the battery with said battery charger based on the charged state temporarily stored by said charged state storing means when recovery of said external power supply from the failure is detected by said recovery-from-failure detecting means.

10. An electric vehicle according to claim 9, wherein said charged state represents a charged time from the start of the charging of the battery to the failure of said external power supply if said charging controller controls the charging of the battery based on a target charging time, said charging resuming means comprising means for resuming the charging of the battery with said battery charger based on a remaining charging time which is calculated by subtracting said charged time from said target charging time.

11. An electric vehicle according to claim 9, wherein said charged state represents a charged capacity from the start of the charging of the battery to the failure of said external power supply if said charging controller controls the charging of the battery based on a target charging capacity, said charging resuming means comprising means for resuming the charging of the battery with said battery charger based on a remaining charging capacity which is calculated by subtracting said charged capacity from said target charged capacity.

12. An electric vehicle according to claim 9, wherein said charged state represents a charging mode upon the failure of the external power supply if said charging controller controls the charging of the battery based on a plurality of charging modes, said charging resuming means comprising means for resuming the charging of the battery with said battery charger based on the charging mode stored by said charged state storing means.

13. An electric vehicle according to claim 8, wherein said vehicle-carried battery comprises an auxiliary battery separate from the battery to be charged by said battery charger.

14. An electric vehicle according to claim 13, further comprising means for charging said auxiliary battery with electric energy from the battery to be charged by said battery charger.

* * * * *